United States Patent
Jung et al.

(10) Patent No.: US 7,409,119 B2
(45) Date of Patent: Aug. 5, 2008

(54) OPTICAL FILTER, MANUFACTURING METHOD THEREOF, AND PLANAR LIGHTWAVE CIRCUIT USING THE SAME

(75) Inventors: Sun-Tae Jung, Anyang-si (KR); Joo-Hoon Lee, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/247,511

(22) Filed: Oct. 11, 2005

(65) Prior Publication Data

US 2006/0093255 A1    May 4, 2006

(30) Foreign Application Priority Data

Oct. 29, 2004    (KR) ................. 10-2004-0087319

(51) Int. Cl.
G02B 6/12    (2006.01)

(52) U.S. Cl. ........................................ 385/14; 385/129
(58) Field of Classification Search ............... 385/14, 385/129
See application file for complete search history.

(56) References Cited

U.S. PATENT DOCUMENTS

| | | | | |
|---|---|---|---|---|
| 6,073,812 | A * | 6/2000 | Wade et al. | 222/189.09 |
| 7,031,575 | B2 * | 4/2006 | Blauvelt et al. | 385/39 |
| 2005/0180755 | A1 * | 8/2005 | Masahiko | 398/135 |
| 2006/0139125 | A1 * | 6/2006 | Shiga-ken et al. | 333/193 |
| 2006/0140547 | A1 * | 6/2006 | Park et al. | 385/89 |

* cited by examiner

*Primary Examiner*—Jennifer Doan
(74) *Attorney, Agent, or Firm*—Cha & Reiter, LLC

(57) ABSTRACT

An optical filter includes a body of a polyhedron structure in which a recess having a predetermined depth from one side surface is exposed on a front surface and a rear surface and a multi-layer thin film which is deposited on the front surface of the body to cover an exposed portion of the recess of the body.

16 Claims, 10 Drawing Sheets

OPTICAL FILTER, MANUFACTURING METHOD THEREOF, AND PLANAR LIGHTWAVE CIRCUIT USING THE SAME

CLAIM OF PRIORITY

This application claims priority to an application entitled "Optical Filter, Manufacturing Method Thereof, And Planar Lightwave Circuit Using The Same," filed in the Korean Industrial Property Office on Oct. 29, 2004 and assigned Serial No. 2004-87319, the contents of which are hereby incorporated by reference.

BACKGROUND OF THE INVENTION

1. Field of the Invention

The present invention relates to an optical filter, particularly to an optical filter which can be mounted in a planar lightwave circuit, etc.

2. Description of the Related Art

An optical filter can be manufactured by various methods depending on the objects and functions of the filter. Some functions include non-reflecting, high reflecting, bandwidth transmitting, or wave division multiplexing or demultiplexing.

Advancement in data communications and digital media has also led to the advancement in optical devices. An example can be seen in the development and use of planar lightwave circuits that has led to miniaturization and high integration of optical devices. The device performs many functions by integrating number of different types of optical filters.

FIG. 1 is a plain view of a planar lightwave circuit in which a conventional optical filter is mounted. Referring to FIG. 1, the planar lightwave circuit 100 includes first and second waveguides 111 and 112, a recess 120 positioned between the first and second waveguides 111 and 112, an optical filter 130 positioned in the recess 120. First and second waveguides 111 and 112, which provide paths for lights, are comprised of an upper clad, an active layer, and a lower clad stacked sequentially on top of a semiconductor substrate (not shown).

The recess 120 is formed by dicing. The first and second waveguides are separated by a predetermined distance due to the recess 120 that traverses through lower clad, the active layer, and the upper clad. The distance between the first and second waveguides is determined by the thickness of the optical filter 130 that is to be inserted.

A light proceeding through the first and second waveguides 111 and 112 is diversed in the recess at a predetermined angle. As the distance between the first and second waveguides 111 and 112 gets larger, more of the light gets diversed and more of the light gets lost. Particularly, if the separation caused by the recess in a conventional single mode waveguide exceeds 30 µm, the engagement loss is substantial as most of the light signal is diversed. Therefore, a general optical filter inserted in the recess 120 should have a thickness of about 15 to 30 µm, and an optical thin film filter which uses a polymide substrate which can have a thickness of under or over 10 µm.

The optical filter 130 can be formed on a substrate of a polymer material by depositing a plurality of dielectric mediums. The optical filter 130 is settled down in a recess 120 and adhered to the recess 120 by a thermosetting medium or ultraviolet rays of high polymer material capable of matching the index of refraction between the first and second waveguides 111 and 112. Epoxy-based or silicon-based material is used for the high polymer. The recess 120 is formed by sawing.

The optical thin film filter described heretofore, however, has several problems. First, it becomes more difficult to treat the film as the film's thickness decreases, and such difficulty leads to rise in manufacturing cost. Second, low thickness of the film exposes it to physical damages under a slight external force. Such exposure hinders the films from being positioned on the planar lightwave circuit to be processed in an optical axis arranging process.

SUMMARY OF THE INVENTION

The present invention has been made to solve the above-mentioned problems occurring in the prior art and provides additional advantages, by providing an optical filter that can be mounted in a planar lightwave circuit and that can be produced by an automated process.

In order to accomplish this object, an optical filter is provided. The optical filter includes a body of a polyhedron structure with a recess with predetermined depth from one side surface of the body having exposed front surface and rear surface and a multi-layer thin film formed on the front surface of the body to cover the exposed portion of the recess of the body.

BRIEF DESCRIPTION OF THE DRAWINGS

The above features and advantages of the present invention will be apparent from the following detailed description in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
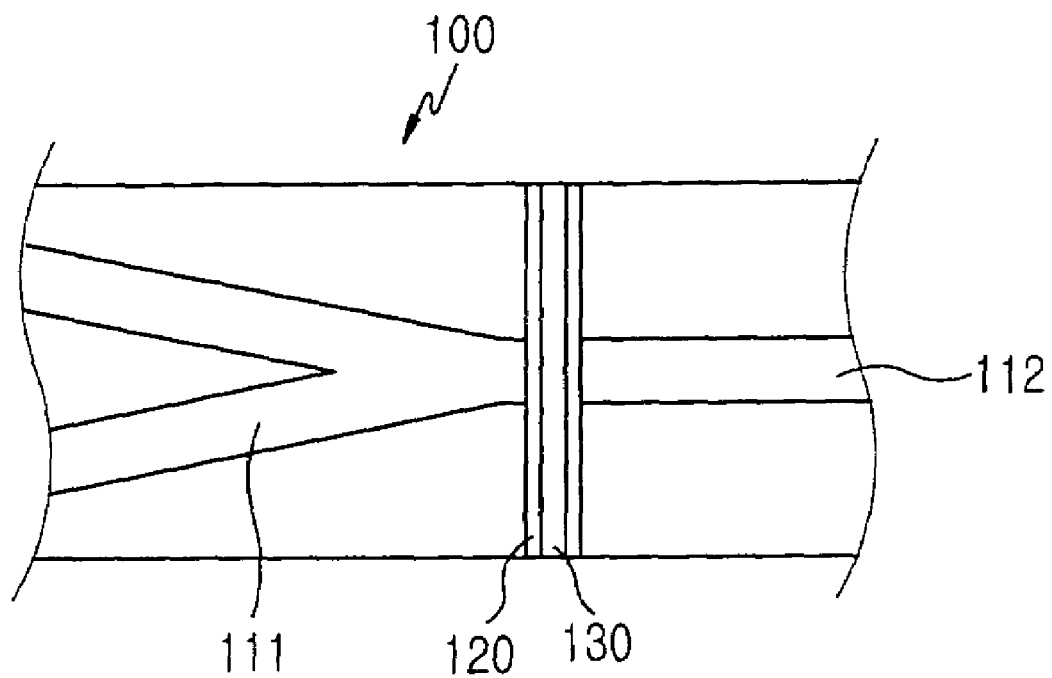
FIG. 1 is a plain view showing a planar lightwave circuit in which a conventional optical filter is mounted.
Figure 2:
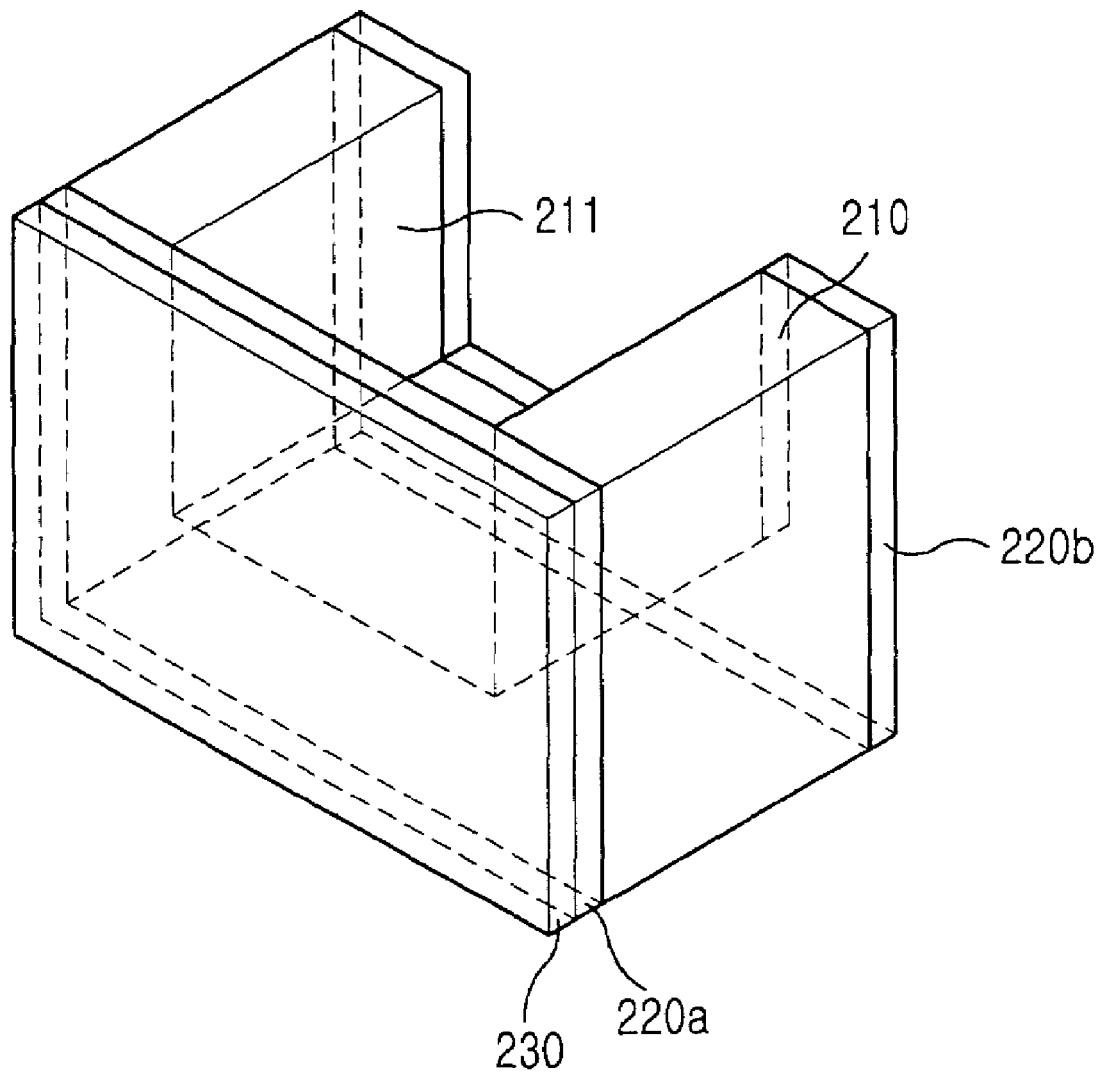
FIG. 2 is a view showing an optical filter according to a first preferred embodiment of the present invention.

FIG. 2 is a plain view of an optical filter according to the first embodiment of the present invention. Referring to FIG. 2, the optical filter 200 includes a body 210, a recess 211, a multi-layer thin film 230 and oxidation films 220a and 220b. The body is of a polyhedron structure containing the recess 211 with a predetermined depth from one side surface of the body 210. The front and rear surfaces of the body 210 and the recess 211 are exposed. A multi-layer thin film 230, along with one oxidation film 220a, is deposited on the front surface of the body 210 to cover the exposed front surface of the recess 211 of the body 210. One other oxidation film 220b covers the exposed rear surface of the body 210.

The body 210 can be manufactured with a wafer made from silicon based material. The oxidation films 220a and 220b are formed on both surfaces of the body by using high-temperature processing. If the oxidation films 220a and 220b are thick, the mechanical strength of the optical filter 230 is reinforced. However, if the oxidation films 220a and 220b are excessively thick, the optical characteristics of the multi-layer thin film 230 are deteriorated. Therefore, the thickness of the oxidation films 220a and 220b is preferably 1 to 2 μm.

The multi-layer thin film 230 can be stacked using dielectric mediums, such as $SiO_2$, $ZrO_2$, and $TiO_2$, or other materials. The multi-layer thin film 230 is deposited on the front surface of the oxidation film 220a, and covers the recess 211 of the body 210.

The multi-layer thin film 230 can be made of a demultiplexing filter which divides a beam of light to series of beams with different wavelengths. In addition, the thin film 230 can be made of a multiplexing filter which combines series of lights with different wavelengths to one beam of light. Furthermore, the multi-layer thin film 230 can be deposited with other thin films such as a band-pass filter, which passes only light of a predetermined wave, or a deflected light beam division filter.

The recess 211 is etched to have a depth from one side surface of the body 210 such that the front and rear surfaces of the body 210 are exposed. In addition, the recess 211 is etched so that it makes contact with the oxidation film 220a of the front surface of the body 210.

Figure 3A:
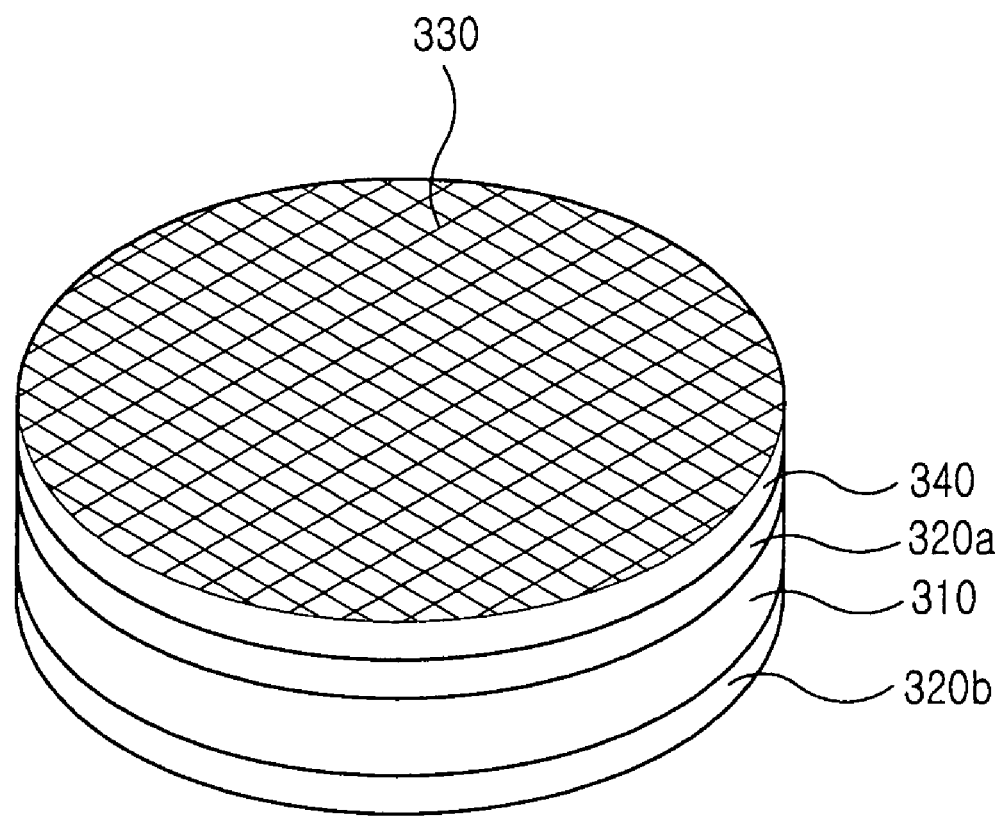
FIGS. 3a and 3b are views explaining the optical filter shown in FIG. 2 in manufacturing steps.
Figure 3B:
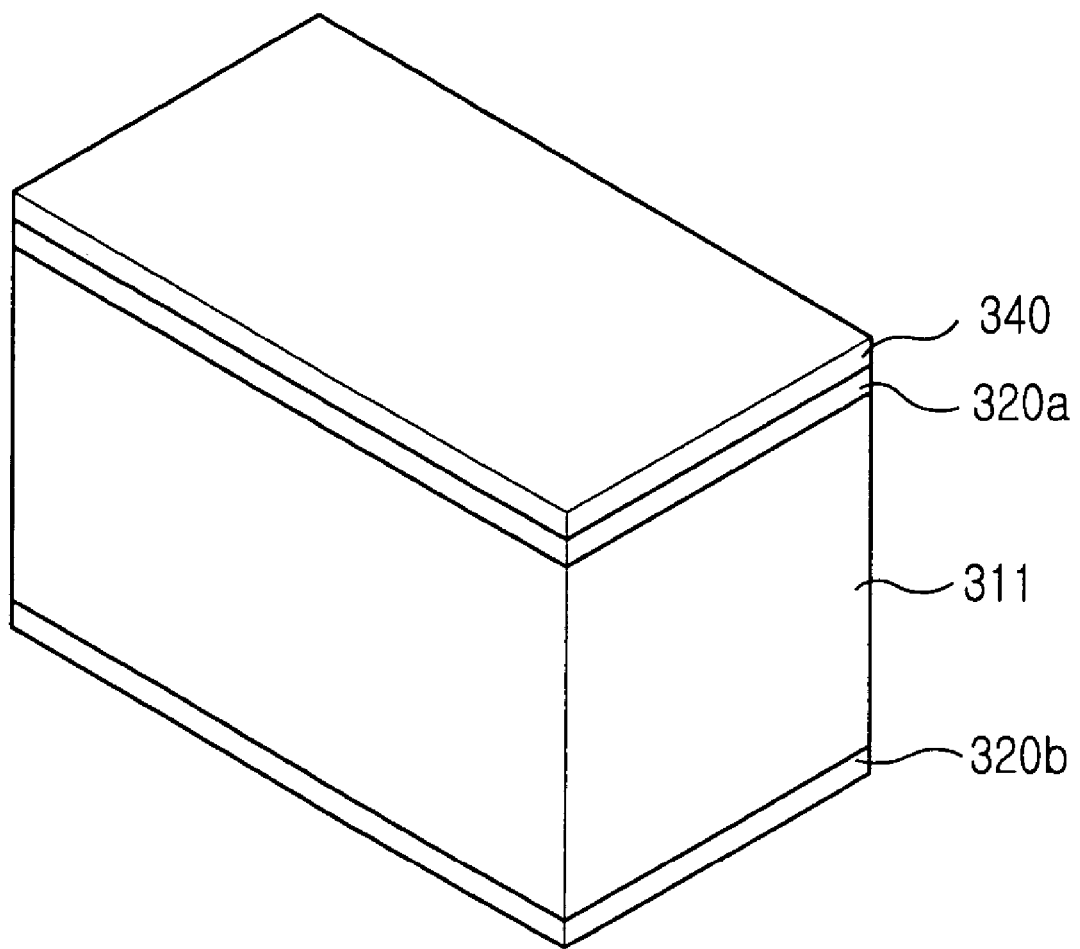
Figure 3C:
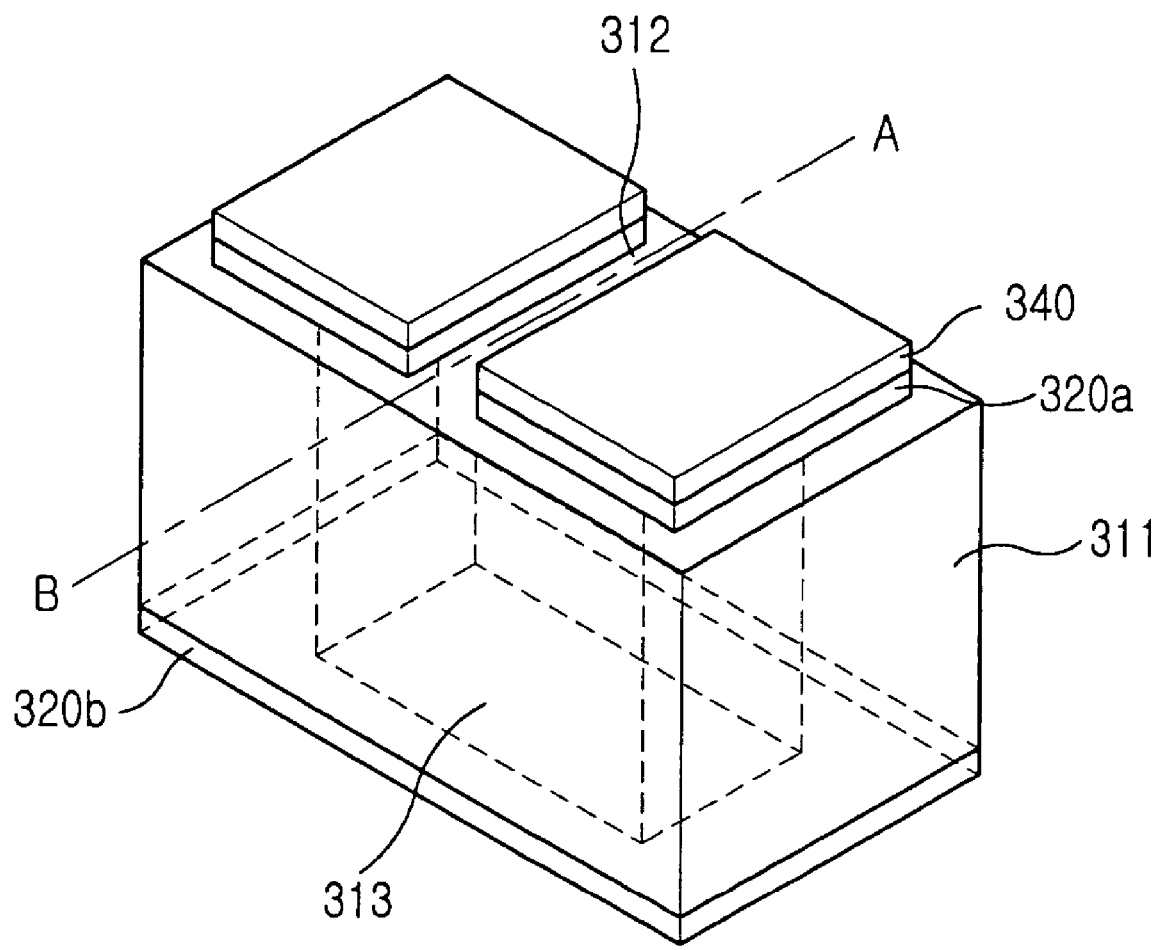

FIGS. 3a to 3c are views explaining the optical filter shown in FIG. 2 according to manufacturing steps. The optical filter 200 shown in FIG. 2 is made of a wafer of silicon material shown in FIG. 3a. It is preferable to use a wafer 310 that is polished on both sides. The thickness of the optical filter 200 is determined according to the thickness of the wafer, and the thickness of the wafer 310 can be selected as occasion demands.

Referring to FIG. 3a, oxidation films 320a and 320b, which are oxidized at high temperature, are formed on the first and second surfaces of the wafer 310, and a multi-layer thin film 340 is deposited on the oxidation film 320a formed on the first surface of the wafer 310.

FIG. 3b shows a status that a plurality of sectors 330 which makes up the wafer 310 are divided into wafer pieces 311 by dicing or other methods.

FIG. 3c shows a status that a trench 313 is formed by etching a part of the body of each the wafer piece 311 and the second oxidation film 320b. The wafer piece 311 is finished by cutting a center of the trench 313 according to the cutting line of A and B shown in FIC 3c. The trench 313 can be formed by Bosch process which is mainly used for deep etching silicon.

Figure 4:
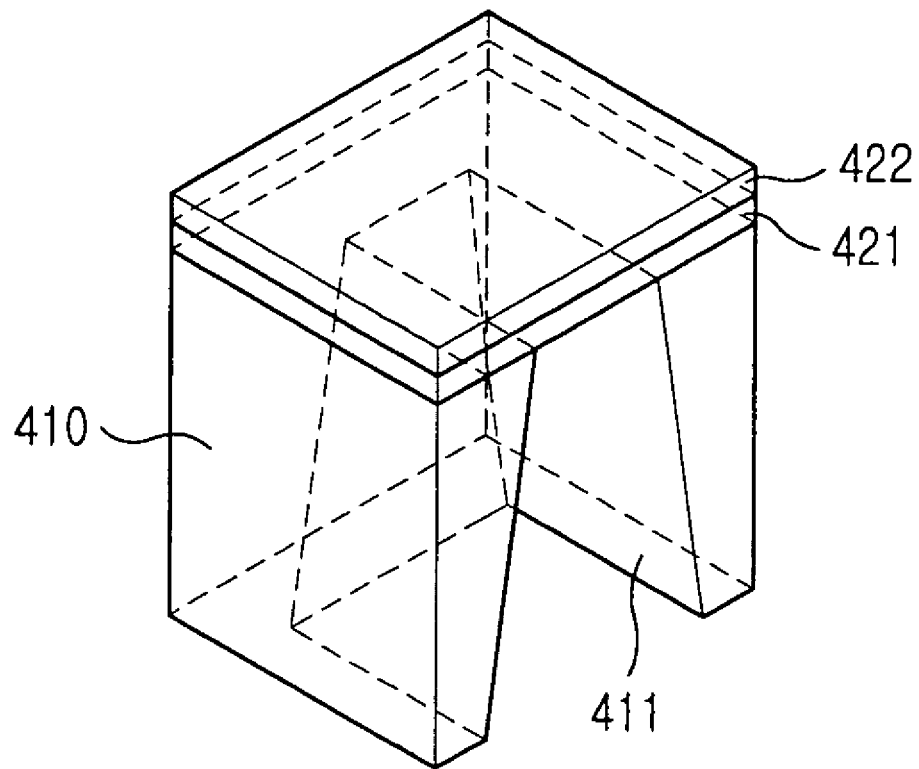
FIG. 4 is a view showing an optical filter according to the second preferred embodiment of the present invention.

FIG. 4 is a view showing an optical filter according to the second embodiment of the present invention. Referring to FIG. 4, the optical filter 400 includes a body 410, a multi-layer thin film 422 situated at the front side of the body 410, and a recess 411 formed in the body 410.

The recess 411 is formed by anisotropic etching. The area of the recess 411 in contact with the oxidation film 421 and the area of the recess 411 exposed to the body are different.

The optical filter 400 is manufactured by using a wafer with oxidation films on both surfaces. It is manufactured by depositing the multi-layer thin film 422 on the oxidation film 421, by forming a trench of a predetermined shape, and by cutting the wafer into a plurality of optical filters. The multi-layer thin film 421 deposited on oxidation films includes a plurality of dielectric medium. Moreover, the trench of a predetermined shape may be formed by etching the wafer.

Figure 5:
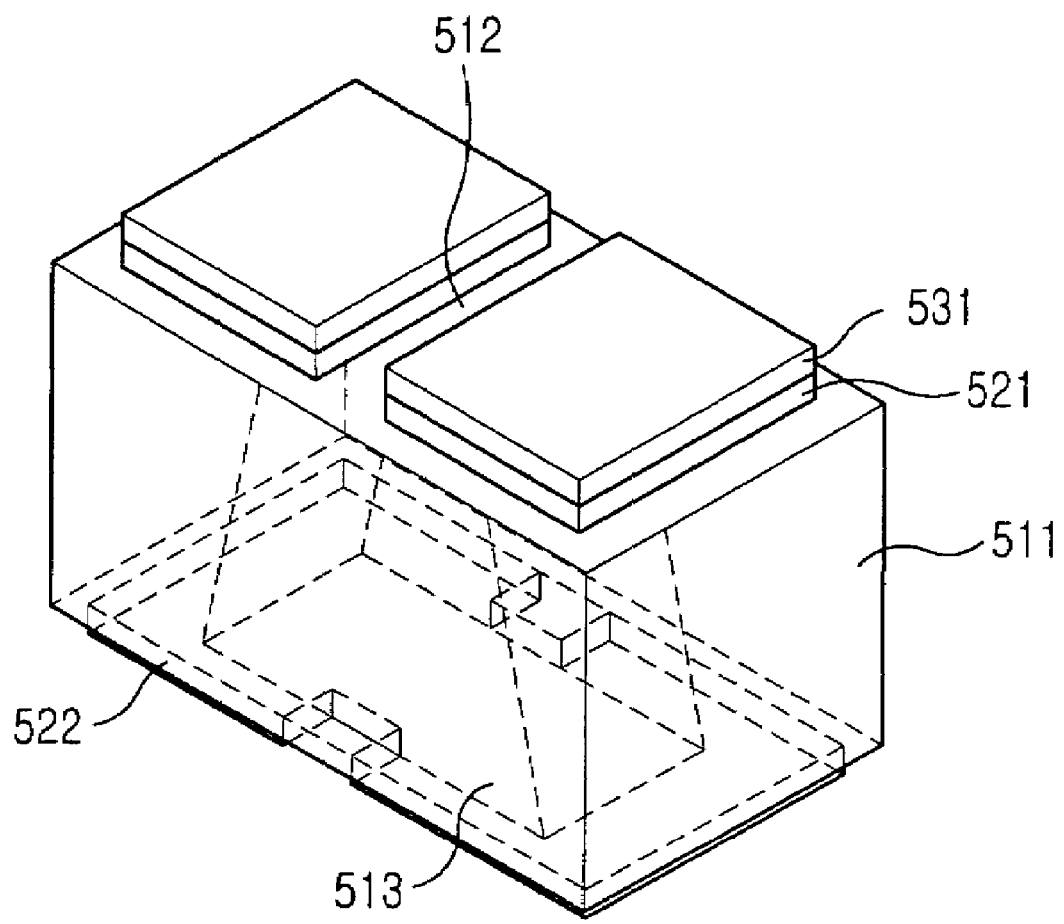
FIG. 5 is a view explaining manufacturing processes of the optical filter shown in FIG. 4.

FIG. 5 shows a step where patterns for cutting the wafer into optical filters are formed. The method of manufacturing the optical filter shown in FIG. 5 is similar to the method shown in FIGS. 3a and 3b. Only difference between two methods is that in FIG. 5, the trench 511 is formed by and cut simultaneously. Specifically, in FIG. 5, the trench 513 is formed in the wafer piece 511 by etching and the wafer piece 511 that contains the trench 513 is cut into the optical filters 200 and 400, as shown in FIGS. 2 and 4, at the same time.

The optical filter cut by etching generates less foreign substances than that cut by dicing or other mechanical cutting methods. Moreover, etching introduces less physical force on the multi-layer thin film. Etching, therefore, can be used to manufacture an optical filter with wide area.

Figure 6:
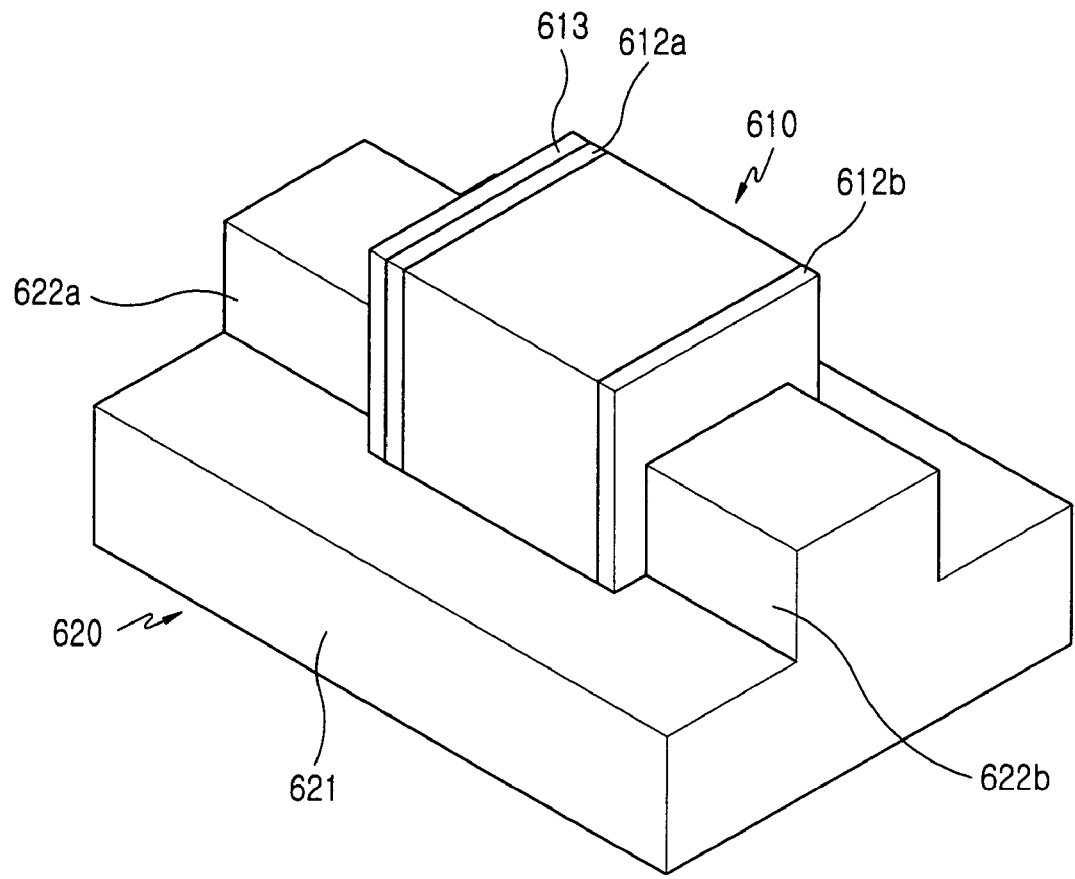
FIGS. 6 to 8 are views showing a state in which an optical filter according to the second preferred embodiment of the present invention is engaged with a planar lightwave circuit.
Figure 7:
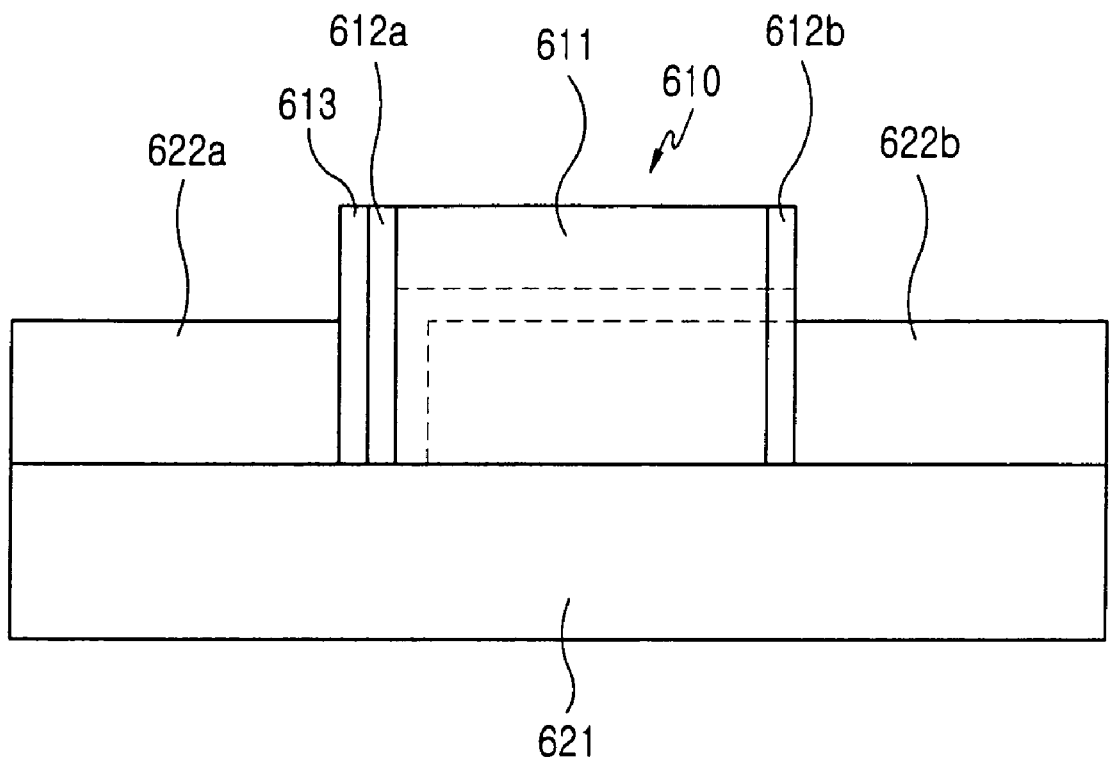
Figure 8:
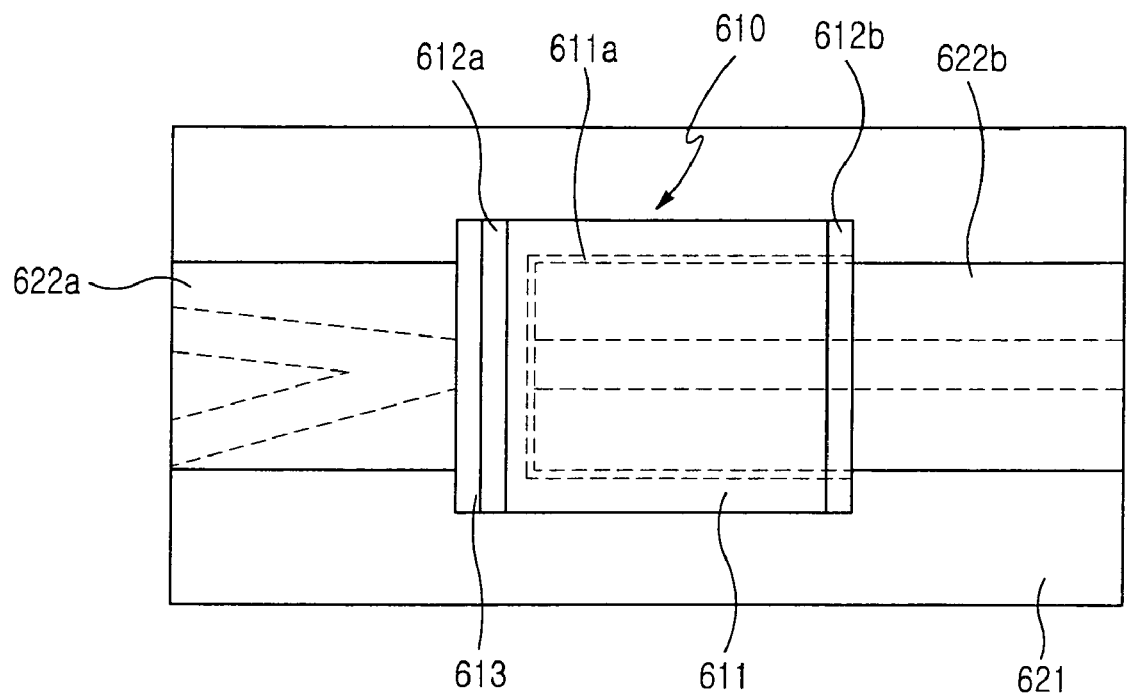

FIGS. 6 to 8 are views showing an optical filter according to the third embodiment of the present invention. Particularly, they show an optical filter as it engages a planar lightwave circuit. Referring to FIGS. 6 to 8, the planar lightwave circuit 620 comprises first and second waveguides 622a and 622b that are separated by a predetermined distance, and the optical filter positioned between the first and the second waveguides. The first and second waveguides comprises an upper clad, an active layer, and a lower clad that are sequentially stacked on a semiconductor substrate 621.

The optical filter 610 comprises a body 611, a recess 611a, a multi-layer thin film 613, and oxidation films 612a and 612b. The body 611 is of a polyhedron structure containing a recess 611a with predetermined depth from one side surface of the body. The front and rear surfaces of the recess is exposed. The multi-layer thin film 613 is deposited on the front surface of the body 611 and is formed on the front surface of the exposed recess 611a of the body 611. Oxidation films 612a and 612b are formed on both surfaces of the body. One of the oxidation films 612a and 612b is formed between the multi-layer 613 and the body 611.

The multi-layer thin film 613 is positioned between the first and second waveguides 622a and 622b as the second waveguide 622b is inserted into the recess 611a. A portion of one surface of the body 611, on which the recess 611a is exposed, makes contact with the semiconductor substrate 621.

Compared to an optical filter in which a multi-layer thin film is deposited on a thin substrate, the present invention offers several advantages. First, the optical filter according to the present invention reduces the manufacturing cost. Particularly, the present invention reduces the deposition cost by using a wafer made of a silicon material and by manufacturing a plurality of optical filters simultaneously. Second, the body under current invention supports the multilayer thin films. Such support renders deep etching of the recess, a process needed to enable the recess to engage with the planar circuit, unnecessary.

The first and second waveguides 622a and 622b are linear type from which a portion is removed, but can be grown to a planar type covering the upper side of the semiconductor substrate 621. If the first and second waveguides 622a and 622b are grown to the planar type, a groove, in which the body 611 is inserted, is formed on the first and second waveguides 622a and 622b.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical filter comprising:
   a body of a polyhedron structure in which a recess having a predetermined depth from one side surface is exposed on a front surface and a rear surface; and a multi-layer thin film which is deposited on the front surface of the body to cover an exposed portion of the recess of the body, further comprising oxidation films formed between the front surface of the body and the multi-layer thin film and formed on the rear surface of the body.

2. The optical filter according to claim 1, wherein the body is made of a silicon material.

3. The optical filter according to claim 1, wherein a plurality of dielectric mediums are stacked in the multi-layer thin film.

4. The optical filter according to claim 1, wherein a metallic medium is stacked in the multi-layer thin film.

5. The optical filter according to claim 1, wherein the multi-layer thin film is a multiplexing filter.

6. The optical filter according to claim 1, wherein the multi-layer thin film is a demultiplexing filter.

7. The optical filter according to claim 1, wherein the multi-layer thin film is a band-pass filter.

8. The optical filter according to claim 1, wherein the multi-layer thin film is a deflected light beam division filter.

9. The optical filter according to claim 1, wherein the thickness of the oxidation films are 1 to 2 μm.

10. A method for manufacturing an optical filter, the method comprising the steps of:
  forming oxidation films by oxidizing first and second surfaces of a wafer;
  depositing a multi-layer thin film on the oxidation film formed on the first surface;
  forming a trench by etching the wafer so as to make contact with the oxidation film of the first surface and a central portion of the second surface; and
  cutting the first surface, the second surface, and the trench to form more than two optical filters each of which has a body.

11. The method according to claim 10, wherein the step for forming the oxidation films on the surfaces of the wafer further comprises the step for forming the film on a silicon wafer.

12. The method according to claim 11, wherein the step for forming the trench and the step for cutting the wafer occur simultaneously.

13. The method according to claim 10, wherein the step for forming the oxidation films on the surfaces of the wafer further comprises the step of forming the film on the wafer that is polished on both sides.

14. The method according to claim 10, wherein the step of cutting the wafer into optical filters each of which has a body comprises providing a path formed on the multi-layer thin film and dicing according to the path.

15. The method according to claim 10, wherein the step for forming the french comprises wet etching.

16. The method according to claim 10, wherein the step for cutting the wafer into more than two optical filters comprises bulk etching.

* * * * *